(12) United States Patent
Stephenson et al.

(10) Patent No.: US 11,377,374 B2
(45) Date of Patent: Jul. 5, 2022

(54) SYSTEM AND PROCESS FOR TREATING WATER

(71) Applicant: Muddy River Technologies Inc., Delta (CA)

(72) Inventors: Robert John Stephenson, Vancouver (CA); Peter Douglas Jack, Delta (CA)

(73) Assignee: Muddy River Technologies Inc., Delta (CA)

( * ) Notice: Subject to any disclaimer, the term of this patent is extended or adjusted under 35 U.S.C. 154(b) by 454 days.

(21) Appl. No.: 16/476,098

(22) PCT Filed: Jan. 3, 2018

(86) PCT No.: PCT/CA2018/000003
§ 371 (c)(1),
(2) Date: Jul. 4, 2019

(87) PCT Pub. No.: WO2018/126312
PCT Pub. Date: Jul. 12, 2018

(65) Prior Publication Data
US 2019/0352195 A1    Nov. 21, 2019

Related U.S. Application Data

(60) Provisional application No. 62/442,603, filed on Jan. 5, 2017.

(30) Foreign Application Priority Data

Jan. 5, 2017 (CA) .................................. CA 2953591

(51) Int. Cl.
*C02F 1/463* (2006.01)
*B01D 19/00* (2006.01)
(Continued)

(52) U.S. Cl.
CPC .......... *C02F 1/463* (2013.01); *B01D 19/0005* (2013.01); *C01B 17/74* (2013.01);
(Continued)

(58) Field of Classification Search
CPC ...................................................... C10G 49/02
(Continued)

(56) References Cited

U.S. PATENT DOCUMENTS

| 4,076,621 A * | 2/1978 | Hardison | ............... B01D 53/52 |
| | | | 210/698 |
| 4,784,775 A * | 11/1988 | Hardison | ............... C02F 1/683 |
| | | | 210/712 |

(Continued)

FOREIGN PATENT DOCUMENTS

| CA | 2891133 | 6/2014 |
| JP | 09262429 | 10/1997 |
| WO | 2016/154531 | 9/2016 |

OTHER PUBLICATIONS

International Search Report for PCT/CA2018/000003 dated Apr. 11, 2018, 3 pages, ISA/CA, Gatineau, Quebec, Canada.

*Primary Examiner* — Nina Bhat
(74) *Attorney, Agent, or Firm* — Antony C. Edwards

(57) ABSTRACT

A method and system for removing at least dissolved hydrogen sulphide or another targeted constituent from a feedstock is provided wherein the targeted constituent has a gas: liquid equilibrium. In some embodiments, the method includes the steps of: contacting the feedstock in at least one stripping vessel with a stripping gas to produce a gas stream containing at least hydrogen sulphide gas; conveying the gas stream from the at least one stripping vessel to an oxidation reactor; contacting the gas stream with an oxidizing agent in the oxidation reactor so as to oxidize the at least hydrogen sulphide gas to produce sulphuric acid; and conveying the produced sulphuric acid from the oxidation reactor to the at (Continued)

least one stripping vessel so as to reduce a pH value of the feedstock within the stripping vessel.

13 Claims, 3 Drawing Sheets

(51) Int. Cl.
| | |
|---|---|
| *C02F 1/00* | (2006.01) |
| *C02F 1/461* | (2006.01) |
| *C02F 1/56* | (2006.01) |
| *C02F 9/00* | (2006.01) |
| *C01B 17/74* | (2006.01) |
| *C01G 49/02* | (2006.01) |
| *C02F 1/20* | (2006.01) |
| *C02F 1/66* | (2006.01) |
| *C02F 101/10* | (2006.01) |
| *C02F 101/20* | (2006.01) |
| *C02F 103/06* | (2006.01) |
| *C02F 103/10* | (2006.01) |
| *C02F 1/24* | (2006.01) |
| *C02F 1/52* | (2006.01) |
| *C02F 101/16* | (2006.01) |
| *C02F 101/32* | (2006.01) |
| *E21B 43/40* | (2006.01) |

(52) U.S. Cl.
CPC .............. *C01G 49/02* (2013.01); *C02F 1/008* (2013.01); *C02F 1/20* (2013.01); *C02F 1/46109* (2013.01); *C02F 1/56* (2013.01); *C02F 1/66* (2013.01); *C02F 9/00* (2013.01); *C02F 1/24* (2013.01); *C02F 1/5245* (2013.01); *C02F 2001/46123* (2013.01); *C02F 2001/46133* (2013.01); *C02F 2001/46171* (2013.01); *C02F 2101/101* (2013.01); *C02F 2101/16* (2013.01); *C02F 2101/203* (2013.01); *C02F 2101/206* (2013.01); *C02F 2101/32* (2013.01); *C02F 2101/322* (2013.01); *C02F 2103/06* (2013.01); *C02F 2103/10* (2013.01); *C02F 2201/4612* (2013.01); *C02F 2201/4617* (2013.01); *C02F 2301/046* (2013.01); *E21B 43/40* (2013.01)

(58) Field of Classification Search
USPC .................................... 210/750, 188; 95/263
See application file for complete search history.

(56) References Cited

U.S. PATENT DOCUMENTS

| | | | | |
|---|---|---|---|---|
| 7,628,924 | B2* | 12/2009 | Ladouceur | B01F 3/04439 |
| | | | | 210/188 |
| 9,364,773 | B2* | 6/2016 | Morris | C10G 21/30 |
| 10,906,823 | B2* | 2/2021 | Archer, III | C02F 1/725 |
| 2007/0199872 | A1* | 8/2007 | Mueller | C02F 9/005 |
| | | | | 210/189 |
| 2008/0267847 | A1* | 10/2008 | Gal | B01D 53/52 |
| | | | | 423/242.1 |
| 2011/0272365 | A1* | 11/2011 | DeFosse | C02F 1/20 |
| | | | | 210/750 |
| 2014/0374104 | A1* | 12/2014 | Seth | E21B 43/40 |
| | | | | 166/305.1 |
| 2015/0013987 | A1* | 1/2015 | Underwood | C02F 1/722 |
| | | | | 166/305.1 |
| 2016/0289575 | A1* | 10/2016 | Brenize | B01D 19/0068 |
| 2017/0113952 | A1* | 4/2017 | Stephenson | B01D 21/00 |

\* cited by examiner

SYSTEM AND PROCESS FOR TREATING WATER

RELATED APPLICATIONS

This Patent Cooperation Treaty patent application claims priority to U.S. Provisional Patent Application No. 62/442,603 filed on Jan. 5, 2017 and Canadian Patent Application No. 2,953,591 filed on Jan. 5, 2017, each of which are incorporated herein by reference.

TECHNICAL FIELD

This disclosure generally relates to a system and process for treating water. In particular, the disclosure relates to a multi-staged system and process for treating wastewater, otherwise referred to herein as a feedstock, that is a mixture of dissolved contaminants or constituents such as hydrogen sulphide, ammonia, volatile organic compounds, iron, microorganisms, oil and grease, emulsified petroleum hydrocarbons, other dissolved metals, dissolved solids, suspended solids or combinations thereof.

BACKGROUND

Various methods and processes for treatment of feedstock are known. The term "feedstock", as used herein, includes various types of waste water, including but not limited to water from hydraulic fracturing; so called fracking, oily water, mining water, industrial wastewater, municipal wastewater, anaerobic digester effluent, landfill leachate, and groundwater. The feedstock is therefore an aqueous mixture which may contain or include one or more contaminants, constituents or components (hereinafter, referred to by the term "constituent"), which one or more constituents need to be removed from the feedstock.

Feedstock may need to be treated to remove one or more constituents from the feedstock for the following reasons: (a) for feedstock obtained from or produced by an industrial process, it may be desirable to re-use that feedstock in the same industrial process so as to conserve water resources and/or prevent discharge of contaminated feedstock to the environment. However, one or more constituents may need to be removed from the feedstock prior to re-using the feedstock in the industrial process; (b) to remove constituents from the feedstock so as to reduce potential harm to people or the air, water, land environment when the feedstock is discharged to the environment; or (c) so constituents, such as metals, nutrients, algae or other materials can be removed and recovered or harvested for other uses.

Feedstock may contain various constituents in different concentrations/proportions. For example, some feedstock may contain constituents which have a significant gas:liquid equilibrium. One example is sour water feedstock containing dissolved sulphide and other dissolved reduced sulphur compounds, such as methyl mercaptan, dimethyl sulphide, and dimethyl disulphide. Other examples of feedstock having constituents with a significant gas:liquid equilibrium include volatile compounds. Examples of such volatile constituents in aqueous feedstocks include paints, coatings, solvents, aliphatic hydrocarbons, ethyl acetate, glycol ethers, acetone, chlorocarbons, chlorofluorocarbons, such as tetrachloroethene or perchloroethylene, constituents of gasoline, such as benzene, ethylene, toluene, and xylene, diesel, oil, methylene chloride, and methyl tert-butyl ether (MTBE) or feedstocks that emit odours; such volatile compounds are individually and collectively referred to herein as "volatile organic compounds." Other examples of constituents in feedstocks that may need to be removed include but are not limited to: dissolved carbon dioxide, ammonia, cyanide, mercury or mercury-containing compounds, or odour-emitting constituents or compounds. Other feedstocks may have constituents whose properties change when exposed to a gas, such as dissolved iron or manganese when contacted with air, oxygen, or ozone.

Some feedstocks may contain iron constituents. One example of such a feedstock is fracking water. Removing iron from fracking water is important because contact of fracking water with oxygen in air results in formation of oxidized iron that is insoluble and thus forms suspended solids. Suspended solids in treated fracking water may prevent re-use of the treated fracking water, due to the risk of the suspended solids fouling the production well surfaces and equipment. Another example of feedstock containing iron as a constituent is groundwater, typically in reduced ferrous form. Similarly, contact of reduced iron containing groundwater with oxygen forms iron hydroxide suspended solids that foul pipes and impact receiving waters. Furthermore, the discharge of reduced iron-containing groundwater to fresh water or marine environments risks toxicity to fish when the iron is oxidized to form insoluble solids which may foul fish gills, impairing gill function.

Conventional processes to treat above-stated feedstocks typically involve adding a reactant such as oxygen in air, ozone, hydrogen peroxide, or chlorine dioxide or other oxidizing agent directly to a feedstock to destroy dissolved sulphide or dissolved ammonia, cyanide, or volatile organic compounds, or to precipitate iron or manganese. Subsequently, produced solids in the treated feedstock are removed by solid:liquid separation technologies such as sedimentation, filtration, or flotation.

Regarding the conventional processes for treating feedstocks described above, adding an oxidizing agent directly to a feedstock to oxidize a targeted constituent, when the feedstock contains other constituents, may be ineffective to remove the targeted constituent (such as, for example, dissolved sulphide or ammonia), because oxidants typically cannot target specific constituents. For example, adding ozone or hydrogen peroxide to a feedstock consisting of fracking water in an attempt to destroy dissolved sulphide may instead result in the oxidation of petroleum hydrocarbons, rather than oxidizing the dissolved sulphide. Such an approach may not result in significant removal of sulphide from the fracking water, even where excessive amounts of the oxidizing agent are applied to the fracking water feedstock.

Furthermore, the process of treating a feedstock by adding a liquid or gaseous oxidizing agent directly to the feedstock can be a slow process, thus requiring large and costly reaction vessels. When using measures to promote the rate and extent of oxidizing reactions, such as intensive mixing of liquid oxidants with liquid feedstock, or methods to accelerate the reaction rate of gaseous oxidants with liquid feedstock, mass transfer for aqueous reactions can be rate limiting due to issues such as reactant solubility limitations, or practical challenges presented in contacting gaseous reactants with liquid feedstock.

Adding oxidizing agents directly to feedstocks may form suspended solids, either as a result of reactions with the targeted constituent in the feedstock or with other non-targeted constituents. Formation of suspended solids risks fouling or plugging of exposed surfaces in the reaction vessel. Typically, such suspended solids may also require separation from the feedstock such as by sedimentation, flotation or filtration, followed by dewatering and disposal of the separated solids.

SUMMARY

An improved process for treating aqueous feedstocks, in some aspects of the present disclosure, involves exploiting the gas: liquid equilibrium of various targeted feedstock constituents to promote shifting the constituent in the aqueous feedstock from the liquid phase to the gaseous phase. The process involves extensively contacting the liquid phase of the feedstock with a gas so as to increase the concentration of the constituent in the gas phase, and then removing the targeted constituents from the gas phase. Advantageously, compared to traditional water treatment methods described above, the oxidation reactions in the gas phase that are part of the processes disclosed herein are not limited by mass transfer limitations of aqueous systems, and consequently they typically proceed rapidly as compared to oxidation reactions occurring in the liquid phase.

In other aspects of the present disclosure, the improved water treatment process may also exploit the capability of ferric iron to serve as a coagulant, even when treating aqueous feedstocks that contain elevated iron concentrations, and then applying stages of oxidation and pH manipulation to remove both the added iron-containing coagulant, as well as the iron that was initially present in the feedstock.

In some embodiments, a method for removing at least dissolved hydrogen sulphide from a feedstock is provided wherein the dissolved hydrogen sulphide has a gas: liquid equilibrium. The method includes the steps of:
    contacting the feedstock in at least one stripping vessel with a stripping gas to produce a gas stream containing at least hydrogen sulphide gas,
    conveying the gas stream from the at least one stripping vessel to an oxidation reactor,
    contacting the gas stream with an oxidizing agent in the oxidation reactor so as to oxidize the at least hydrogen sulphide gas to produce sulphuric acid,
    conveying the produced sulphuric acid from the oxidation reactor to the at least one stripping vessel so as to reduce a pH value of the feedstock within the stripping vessel.

In some embodiments, a targeted pH value of the feedstock is substantially a pH value of 4. In other embodiments, the method step of contacting the feedstock with a stripping gas includes increasing a surface area of the feedstock in contact with the stripping gas. Increasing the surface area of the feedstock in contact with the stripping gas includes one or more selected from a group comprising: spraying the feedstock into a headspace of the stripping vessel, bubbling the stripping gas through the feedstock, agitating the feedstock with a mechanical agitator.

In some aspects of the present disclosure, the oxidizing agent is selected from a group comprising: oxygen, ozone, hydrogen peroxide, chlorine dioxide. In other aspects, the feedstock in the at least one stripping vessel is raised from an initial temperature to a stripping temperature so as to increase a concentration of the hydrogen sulphide gas in the gas stream produced in the stripping vessel.

In some aspects, the step of contacting the gas stream with an oxidizing agent in the oxidation reactor produces a recycled stripping gas, the method further comprising a step of conveying the recycled stripping gas to the at least one stripping vessel so as to contact the feedstock in the at least one stripping vessel with the recycled stripping gas to produce a further gas stream containing hydrogen sulphide gas.

In some embodiments, after treating the feedstock in the at least one stripping vessel so as to substantially remove the dissolved hydrogen sulphide from the feedstock produces an intermediate feedstock including a first amount of iron and one or more dissolved constituents, the method further comprises the steps of:
    adding a cationic coagulant comprising ferric iron to the intermediate feedstock, the intermediate feedstock including a first amount of iron and one or more dissolved constituents, so as to convert the one or more dissolved constituents to an insoluble form; and
    removing the first amount of iron and the insoluble form from a liquid fraction of the feedstock.

In some aspects, the step of removing the first amount of iron comprises oxidizing the first amount of iron so as to form an insoluble precipitate. In other aspects, the method may include a step of contacting the insoluble form or the insoluble precipitate with gas bubbles so as to make the insoluble form or the insoluble precipitate buoyant and float over the liquid fraction. The gas bubbles may be selected from a group comprising: air bubbles, oxygen bubbles.

In other aspects, the method may further comprise a step of processing the liquid fraction by passing the liquid fraction through an electrocoagulation system so as to remove one or more negatively charged constituents dissolved in the liquid fraction.

In some embodiments of the present disclosure, a system for removing at least dissolved hydrogen sulphide from a feedstock, the dissolved hydrogen sulphide having a gas: liquid equilibrium, comprises at least one stripping vessel wherein the feedstock contacts a stripping gas to produce a gas stream containing hydrogen sulphide gas, a first conduit connecting the at least one stripping vessel to an oxidation reactor for conveying the gas stream containing the hydrogen sulphide gas to the at least one oxidation reactor, wherein the gas stream contacts an oxidizing agent so as to oxidize the hydrogen sulphide gas to produce sulphuric acid, and a second conduit connecting the oxidation reactor to the at least one stripping vessel for conveying the produced sulphuric acid from the oxidation reactor to the stripping vessel.

In some aspects, the system includes removing hydrogen sulphide gas from the gas stream in the oxidation reactor to produce a recycled stripping gas, wherein the recycled stripping gas is returned to the at least one stripping vessel via the second conduit.

DETAILED DESCRIPTION

Gas Stripping for Removal of a Targeted Constituent from a Feedstock

In an embodiment of the present disclosure, the improved process maximizes contact of the liquid feedstock with a gas by means of pumped recirculation spray of the liquid feedstock through spray nozzles into a contained gas headspace within a sealed stripping vessel. The improved process removes and replaces the gas phase from the stripping vessel with gas that is free of the constituent (referred to herein as the "stripping gas") in order to maximize the difference in constituent concentration between the gas phase and the liquid feedstock. Maximizing the difference in constituent concentration between the constituent-lean gas phase and the constituent-rich liquid phase of the feedstock favours migration of the one or more target constituents from the liquid phase to the gas phase. Favouring stripping of constituents from the feedstock into the gas phase or gas stream may be further promoted by controlling certain variables of the feedstock, including but not limited to the pH and temperature of the feedstock, which variables impact the volatility of the targeted constituent. Once stripped from the liquid phase and shifted to the gas phase, constituents in the gas phase may be destroyed, reacted, or otherwise removed from the gas phase, so that the gas phase with constituents removed, otherwise referred to as the stripping gas, may be recirculated to the stripping vessel so as to serve as the transport medium of the gaseous targeted one or more constituents from the stripping vessel.

Figure 1:
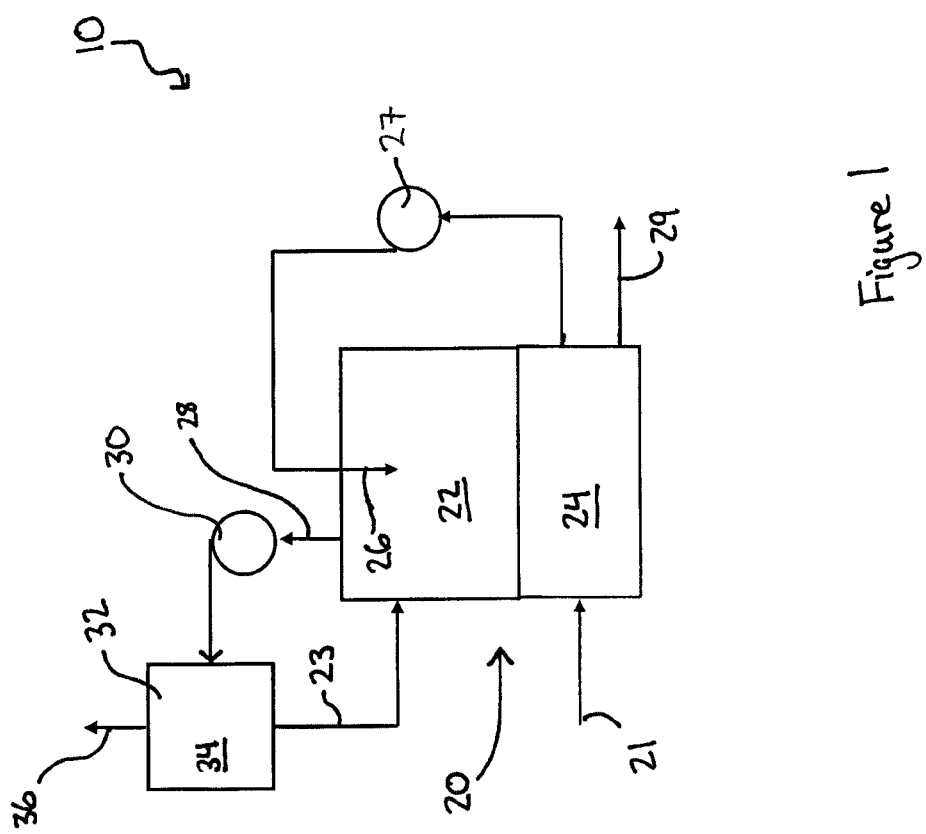
FIG. 1 is a schematic illustrating an embodiment of a gas stripping system in accordance with the present disclosure.
Figure 2:
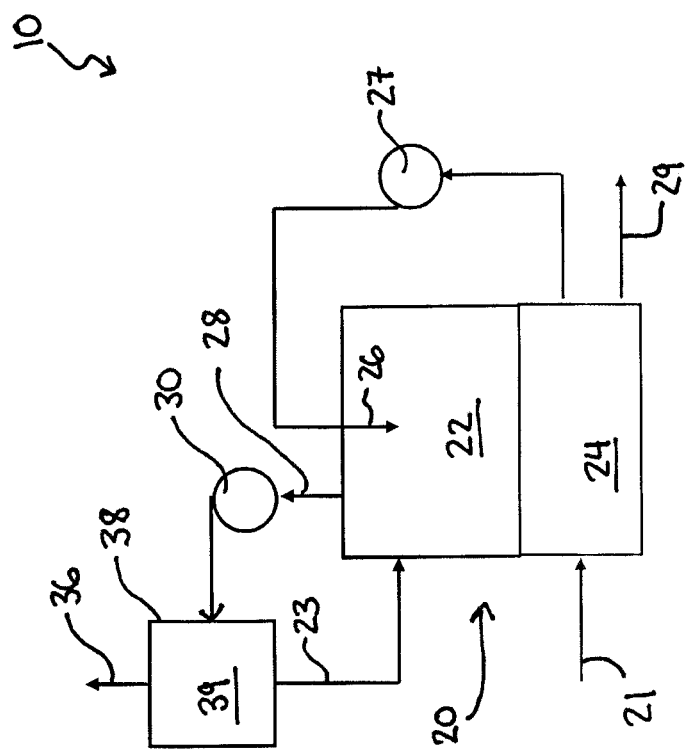
FIG. 2 is a schematic illustrating another embodiment of a gas stripping system in accordance with the present disclosure.

Exploiting the gas: liquid equilibrium of a targeted constituent in a feedstock requires extensive contact between the stripping gas and the liquid feedstock. This can be achieved using gas: liquid contacting equipment such as packed beds or bubble columns, but this equipment is costly. Referring to FIGS. 1 and 2, in the present disclosure, preferred gas: liquid contacting methods include high shear mechanical mixers or spray nozzles, such as the spray nozzles 26, that recirculate, via a pump 27, and spray the liquid feedstock 24 into the headspace 22 of an enclosed tank, referred to as the stripping vessel 20, thereby releasing the gaseous form of the targeted constituent into the closed headspace. Compared with packed beds or bubble columns, mechanical mixers or spray nozzles are smaller and less complex, they require less infrastructure, and are less expensive to build and operate.

In some embodiments, the improved process disclosed herein may maximize contact of the liquid feedstock 24 with the gas phase containing the stripping gas within headspace 22 by means of pumped recirculation spray of liquid feedstock through spray nozzles 26 into the contained headspace within the stripping vessel. Other methods for maximizing the contact between the liquid feedstock and the stripping gas may include mechanical agitation of the liquid feedstock and/or bubbling the stripping gas through the liquid feedstock, used either alone or in combination with spraying the feedstock through nozzles into the contained headspace, preferably so as to form a fine mist of the liquid feedstock within the headspace. Once stripped from the liquid phase and shifted to the gas phase, constituents in the gas phase may be destroyed, reacted, or otherwise removed from the gas phase, so the gas phase with constituents removed (otherwise referred to herein as the stripping gas), in some embodiments, may be recirculated through the stripping vessel 20 so as to provide the transport medium for transporting the targeted constituents in the gaseous phase from the stripping vessel to another location, such as an oxidation reactor for further treatment. For example, as shown in FIG. 1, the gas phase within the headspace 22 may be removed through gas outlet 28, for example by using a blower 30, and fed into an oxidation reactor 32, where the gas phase containing the targeted gaseous constituent is treated with an oxidizing agent 34. Optionally, once the targeted gaseous constituent has been removed from the gas phase within the oxidation reactor 32, the stripping gas may be recirculated into the headspace 22 of the stripping vessel 20 through inlet 23.

The overall process of stripping targeted constituents in a feedstock from liquid phase to gaseous phase, and then removing the targeted constituents from the gas phase, will now be described in detail with reference to specific examples of feedstock constituents which may be removed from a feedstock. For example, to treat liquid feedstock containing dissolved sulphide (such feedstock commonly referred to as "sour water"), feedstock 24 is continuously fed into the stripping vessel 20 via feedstock inlet 21, and the improved process uses a pump 27 to recirculate the sour water feedstock 24 through one or more spray nozzles 26 into a closed headspace 22 of a stripping vessel 20, therefore pushing the equilibrium of the dissolved sulphide into the gas phase as hydrogen sulphide gas ($H_2S$). In some embodiments, the gas phase in the stripping vessel may be conveyed through gas outlet 28 to an oxidation reactor 32 via blower 30, where the gas phase is contacted by an oxidizing agent 34, such as ozone, oxygen, chlorine dioxide or hydrogen peroxide, to oxidize the hydrogen sulphide gas, producing sulphuric acid. The treated gas, free of hydrogen sulphide, may be returned or recirculated to the headspace 22 of the stripping vessel 20. In some embodiments, the product of the oxidation reaction, sulphuric acid, may also be returned to the stripping vessel, thus lowering the pH of the feedstock and thereby shifting the equilibrium of the HS— and S2-sulphide ions in the liquid feedstock towards dissolved, un-ionized $H_2S$ that is in equilibrium with the $H_2S$ within the stripping gas contained in the headspace of the stripping vessel, therefore increasing the removal of un-ionized $H_2S$ from the liquid phase into the gaseous phase as the $H_2S$ gas is continuously removed from the stripping vessel and replaced with a stripping gas that is free of $H_2S$.

In some embodiments, stripping of dissolved sulphide may also be promoted by increasing the temperature of the feedstock, which lowers solubility of the sulphide and therefore pushes the dissolved $H_2S$ in the liquid phase to the gas phase. As an alternative to oxidation of hydrogen sulphide gas, in some embodiments, the stripping gas containing $H_2S$ may be reacted with chemicals such as iron or caustic to remove the $H_2S$ gas, again allowing the stripping gas with the $H_2S$ removed to recirculate back to the stripping vessel to continue serving as the transport medium of gaseous constituents from the stripping vessel. In still other embodiments, once the $H_2S$ gas has been removed from the stripping gas, the stripping gas may be vented to the atmosphere.

As a further example, feedstock such as landfill leachate, animal manure, industrial wastewater, or municipal wastewater may contain constituents including ammonia. Similar to the process described above for treating sour water feedstocks, feedstocks containing ammonia as a targeted constituent may involve spraying the liquid feedstock through one or more spray nozzles in a closed headspace stripping vessel. The stripping gas contained in the headspace of the stripping vessel flows to a separate vessel where the ammonia is then removed from the stripping gas by processes such as chemical reaction or adsorption. The treated stripping gas, once free or substantially free of ammonia gas, may then be recirculated to the headspace of the stripping vessel so as to serve as a transport medium to convey the gaseous ammonia constituent from the stripping vessel to another location for removal of the ammonia.

To strip ammonia from the feedstock, the pH of the liquid feedstock is preferably made alkaline so as to push the equilibrium of the targeted constituent in the liquid phase towards ammonia ($NH_3$) from the ionic form, ammonium ($NH_4^+$), which is more predominant in a liquid having a neutral or acidic pH. It is only the un-ionized $NH_3$ and not $NH_4^+$ that has a gas: liquid equilibrium and thus can be stripped from the liquid phase. Favouring stripping of dissolved ammonia may also be promoted by increasing the temperature of the feedstock, thus driving $NH_3$ to the gas phase. Similar to the above example related to sour water, the treated gas with ammonia removed may be recirculated to the stripping vessel to serve as the transport medium of gaseous constituents from the stripping vessel.

A further example of feedstock which may be treated by this process includes water containing dissolved volatile organic compounds (VOCs). Similar to the sour water and ammonia-containing feedstock examples described above, the VOC-containing feedstock may be recirculated through one or more spray nozzles into a closed headspace of the stripping vessel. The stripping gas in the stripping vessel, containing VOCs, may be conveyed to a reaction or adsorption vessel 38, containing a chemical reactant or adsorption medium 39, such as illustrated in FIG. 2, to remove the gaseous VOCs from the stripping gas. The treated stripping gas is then free of VOCs and, in some embodiments, may be recirculated to the headspace of the stripping vessel so as to serve as the transport medium for conveying gaseous VOCs from the stripping vessel. Stripping dissolved VOCs may be promoted by adjusting the pH and/or increasing the temperature of the feedstock, driving VOCs to the gas phase.

Sour Water Treatment Process for Removing Dissolved Hydrogen Sulphide

The following is a description of utilizing the water treatment process described above to treat a sour water feedstock so as to remove the targeted constituent, dissolved sulphide. However, it will be appreciated by a person skilled in the art that the gas stripping procedure described below, in relation to removing the specific feedstock constituent of dissolved sulphide from the sour water, may be adapted to remove other targeted feedstock constituents which exist in a gas: liquid equilibrium, and that the example below of removing dissolved sulphide from sour water is not intended to be limiting.

Dissolved sulphide is present as hydrogen sulphide ($H_2S$), bisulphide ($HS^-$), or sulphide ($S^{2-}$), depending on the pH of the solution. Hydrogen sulphide ($H_2S$) is the non-ionized form of dissolved sulphide that is dominant under acidic conditions, whereas bisulphide ($HS^-$) and sulphide ($S^{2-}$) are the ionized forms of dissolved sulphide that predominate under alkaline conditions.

Of the dissolved inorganic sulphide species, a gas: liquid equilibrium exists only for hydrogen sulphide because it is un-ionized. Since dissolved hydrogen sulphide $H_2S_{aq}$ is in equilibrium with $H_2S$ gas, dissolved hydrogen sulphide can be stripped from sour water using extensive gas:water contact to release $H_2S$ gas. For hydrogen sulphide to be the dominant form of dissolved sulphide, efficient stripping of dissolved sulphide from sour water requires an acidic pH; ideally, a pH value of substantially four (4.0).

In the process described herein, $H_2S$ gas that is removed from a sour water feedstock is subsequently oxidized using chemicals such as ozone or hydrogen peroxide, producing sulphuric acid ($H_2SO_4$). This sulphuric acid is added back to influent sour water stream rather than being neutralized using alkaline chemicals and disposed of as a waste. An acidic pH shifts dissolved sulphide away from $HS^-$ and $S^{2-}$ which cannot be stripped, towards ($H_2S_{aq}$) which can be stripped as $H_2S$ gas. Testing confirms fast and effective removal of dissolved sulphide from sour water.

The water treatment process described herein employs intensely contacting sour water with a stripping gas, such as air or oxygen for example, that is free or substantially free of hydrogen sulphide. Stripping gas which is substantially free of $H_2S$ provides a large difference in the concentration of dissolved sulphide compared to $H_2S$ in the liquid phase. The stripping gas does not react with dissolved sulphide to any significant extent, so it may be continuously re-circulated to the stripping vessel so as to strip hydrogen sulphide from the liquid phase to the gas phase, reducing or eliminating the need to discharge the stripping gas to the environment.

A high degree of contact between the stripping gas and sour water exploits the gas: liquid equilibrium of $H_2S$ in water by shifting dissolved sulphide to $H_2S$ gas which collects in the headspace of the stripping vessel. The $H_2S$ gas is subsequently oxidized using oxidizing chemicals such as ozone or hydrogen peroxide to form sulphuric acid ($H_2SO_4$). This produced sulphuric acid may be returned to the influent sour water feedstock so as to lower pH of the feedstock and thus shift dissolved sulphide away from $HS^-$ and $S^{2-}$ towards $H_2S$.

Destruction of $H_2S$ Gas Using an Oxidizing Agent

In some embodiments of the present disclosure, without intending to be limiting, in-situ generated sulphuric acid produced by oxidation of $H_2S$ helps to acidify sour water. If additional acid is required to assist with sour water stripping, a pH controller doses influent sour water with an acid such as hydrochloric acid or sulphuric acid (acid choice depends on cost and on water quality requirements of treated water) to a target pH level of substantially 4.0, at which pH level essentially all sulphide is present as un-ionized $H_2S$ gas, and thus the dissolved sulphide has a gas: liquid equilibrium facilitating the stripping of the $H_2S$ from the liquid phase. Acidic sour water continuously flows into at least one gas stripping vessel; optionally, a plurality of gas stripping vessels may be connected in series so as to optimize the concentration difference of the targeted constituent in the gas phase contained in the headspace of each vessel, as compared to the concentration of the targeted constituent dissolved in the liquid phase in each vessel (in this specific case, the targeted constituent being $H_2S$). In other embodiments, a plurality of stripping vessels may be connected in parallel so as to provide increased capacity for large installations. Each stripping vessel aggressively recirculates sour water in a tank through lifting water by a mechanical mixer and/or, preferably, by pumping and spraying sour water into an enclosed headspace of each gas stripper so dissolved sulphide shifts to the tank's headspace as hydrogen sulphide gas, thus removing sulphide from solution.

In some embodiments, oxidizing agents, such as ozone or hydrogen peroxide, may be introduced into the headspace of each gas stripper reactor; for example by feeding ozone gas or spraying hydrogen peroxide into the headspace. Alternatively, the gas headspace of each reactor is transferred into an $H_2S$ oxidation reactor, wherein the ozone or hydrogen peroxide is introduced. Based on a signal from an ozone sensor in an $H_2S$ oxidation reactor, air may supply an oxygen concentrator which supplies an ozone generator. Ozone is introduced into an $H_2S$ oxidation reactor to oxidize sulphide and produce sulphur dioxide ($SO_2$) gas. Alternatively, in cases where hydrogen peroxide is the oxidizing agent, an $H_2S$ sensor within the oxidation reactor may trigger pumping or spraying of hydrogen peroxide into the reactor. $SO_2$ gas plus water forms sulphuric acid that may be returned to acidify sour water fed to the system. Gas from an $H_2S$ oxidation reactor is recirculated to at least one gas stripper vessel and is returned back to the $H_2S$ oxidation reactor. In some embodiments, prior to discharging any excess stripping gas to ambient air, $SO_2$, unreacted ozone, and other constituents in the gas phase may be adsorbed by activated carbon. The rate of sour water fed to the sulphide removal process may be controlled by a sensor that measures the concentration of dissolved sulphide in treated effluent.

In some embodiments, the above described process of stripping a targeted constituent from a feedstock by exploiting the gas: liquid equilibrium of the targeted constituent may be one step in a series of steps for removing various additional constituents from the feedstock. Other water treatment processes to remove additional constituents from the treated feedstock flowing through feedstock outlet 29 may include, for example, coagulation, electrocoagulation and polymer flocculation, and separation of precipitates using liquid/solid separation techniques.

Without intending to be limiting, the process described above may provide one or more of the following advantages, as compared to the prior art processes:

1. Unlike methods that oxidize or precipitate dissolved sulphide in sour water, removing $H_2S$ gas from the aqueous feedstock and then oxidizing the removed $H_2S$ gas avoids oxidizing chemicals being consumed by organic or inorganic constituents in addition to the dissolved sulphide that may be present in the sour water.
2. Where ozone is the oxidizing chemical used, hydrogen sulphide gas is destroyed using ozone that is generated at site to produce sulphuric acid that is used in the process, so no externally sourced chemicals are required.
3. Compared to the slow reaction of ozone in water, ozone gas destruction of $H_2S$ gas is rapid, requiring just small, simple and relatively low cost equipment.
4. As an alternative to ozone, hydrogen peroxide can be used to destroy $H_2S$ to produce sulphuric acid that is used in the process.
5. By returning sulphuric acid that is produced by the process back to acidify influent sour water rather than using alkaline chemicals such as calcium hydroxide ($Ca(OH)_2$) or sodium hydroxide (NaOH) to neutralize sulphuric acid, there is no solid or liquid waste for disposal.
6. Compared to stripping towers and typical bubble contactors of conventional gas stripping methods, the process described herein provides a high degree of contact of sour water with the stripping gas to result in fast and efficient mass transfer of dissolved sulphide to $H_2S$ gas.
7. The process is fast and inexpensive because ozone or hydrogen peroxide may be used to oxidize gaseous contaminants only.
8. Only electricity or common industrial chemicals are used to produce sulphuric acid, a by-product that is used in the process, thus avoiding a need to neutralize the acid and generating a solid waste for disposal.

Treatment of Iron-Containing Feedstock with an Iron Rich Coagulant

Other constituents which may need to be removed from a feedstock include various forms of iron. Iron is a constituent that may be particularly difficult to manage constituent in aqueous feedstocks, such as water from fracking or groundwater, because oxygen readily converts the soluble ferrous $Fe^{2+}$ form to the much less soluble ferric $Fe^{3+}$ form. This results in rust-coloured solids being precipitated from the feedstock, which may cause staining and fouling of surfaces of equipment coming into contact with the feedstock. As such, adding iron-based coagulants so as to treat feedstock containing high iron concentrations may be counterintuitive to a person ordinarily skilled in the art.

However, the Applicant has observed that adding iron-based coagulants to treat feedstocks that already contain high concentrations of iron may result in enhanced coagulation and flocculation of insoluble iron, as well as other constituents, so as to enable their removal by liquid: solid separation methods such as flotation, sedimentation, or filtration.

Dissolved iron consumes dissolved oxygen and thus decreases the concentration of dissolved oxygen in aqueous feedstocks. Consequently, the greater the concentration of iron, the greater the portion of reduced ferrous iron and therefore the more soluble the iron becomes in the raw feedstock. By adding ferric iron to the feedstock, even feedstock that contains iron, while also providing a source of oxygen such as by gas flotation using air, oxygen or ozone, the added ferric iron serves as a coagulant to remove existing constituents, including iron and/or coagulated or precipitated solids, from the liquid phase.

In some embodiments of the improved process disclosed herein, iron may be added as a coagulant to remove constituents such as petroleum hydrocarbons, dissolved sulphide, iron, and other poorly soluble compounds from feedstocks. Ferric iron is a preferred coagulant because it can subsequently be removed from feedstocks by manipulating pH and redox potential to minimize the solubility of iron in water. Other cationic coagulants, such as aluminum chloride, aluminum sulphate, or polymeric coagulants, are less amenable to removal from the feedstock once added, so they are therefore less desirable for feedstock treatment applications where residual concentrations of added treatment chemicals cannot be tolerated.

Figure 3:
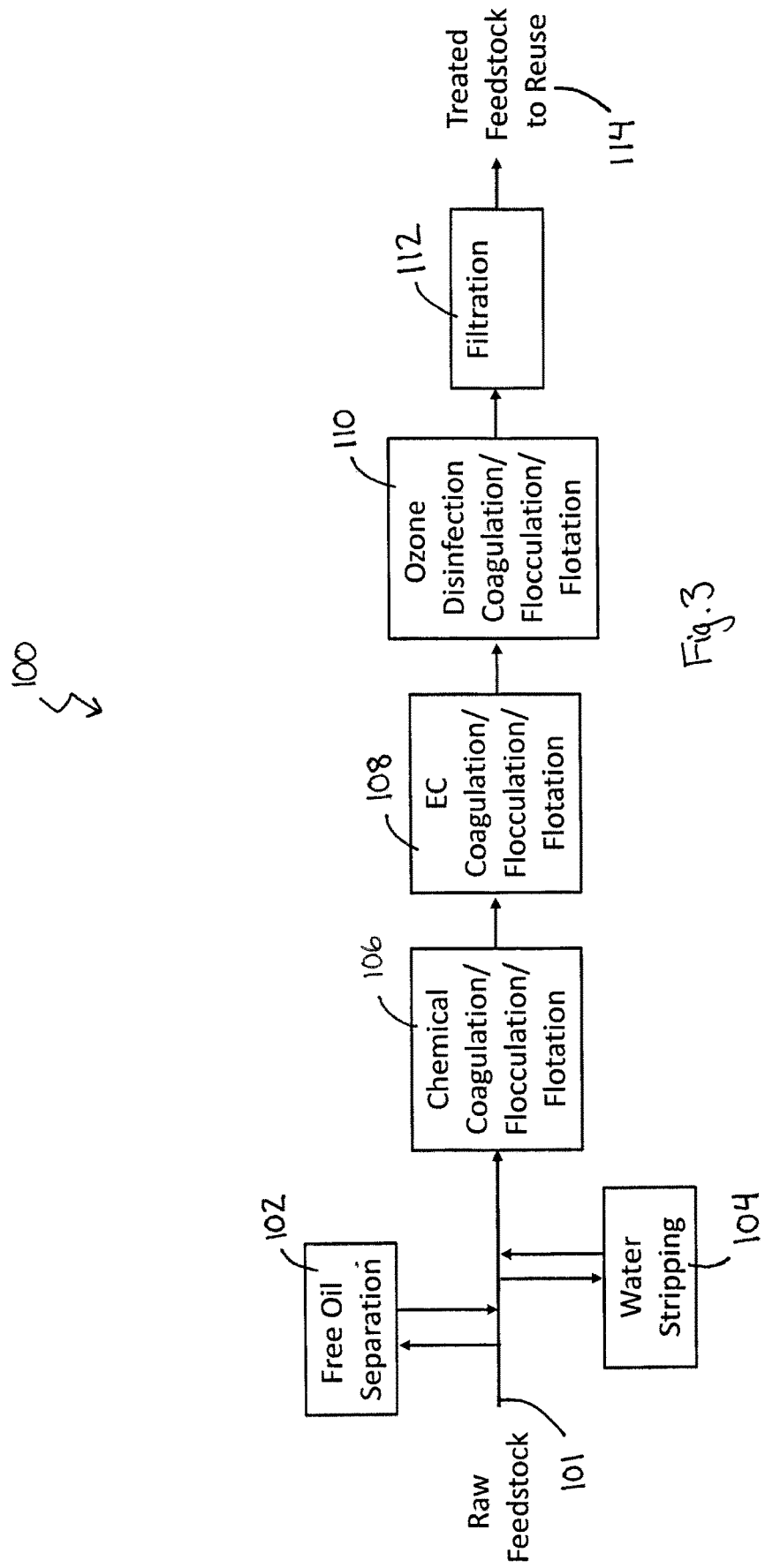
FIG. 3 is a block diagram illustrating an embodiment of a water treatment process in accordance with the present disclosure.

Referring to FIG. 3, ferric iron may be added to serve as a first stage of solids removal in treating raw feedstock 101, in an improved process for chemical coagulation at step 106 of an overall water treatment process 100, the addition of ferric iron followed by flocculation and separation of the coagulated and flocculated solids by means of flotation in step 106, typically using air as the flotation bubbles although pure oxygen may also be used. Although ferric iron lowers pH and thus favours solubility of iron which would decrease the effectiveness of coagulation, also adding oxygen in the separation step helps to shift iron to its less soluble ferric form and thus separation of coagulated solids occurs.

The overall water treatment process 100 which may be applied to treat, for example, a raw feedstock 101 comprising fracking water, may include the steps of free oil separation 102 and water stripping through the stripping gas process described above in the present application, at step 104, steps 102 and 104 preceding the chemical coagulation step 106 described above. Subsequent addition of reactive oxygen via electrocoagulation, at step 108, and ozonation, at step 110, when coupled with pH adjustment through electrocoagulation or chemical sources of alkalinity, results in removal of both the added iron in the cationic coagulant comprising ferric iron, as well as the first amount iron that was present in the raw feedstock, and additionally enhances the removal of a range of constituents from the feedstock. Final solids removal may then occur at step 112, by filtration, resulting in treated feedstock 114 ready for re-use, for example, as a fracking fluid. Although the overall water treatment process 100 is described herein using an example of treating fracking fluid as a raw feedstock 101, it will be appreciated by a person skilled in the art that the water treatment processes described herein may be used to treat various different types of feedstocks containing a variety of dissolved constituents targeted for removal.

What is claimed is:

1. A method for removing one or more dissolved constituents from a feedstock, the one or more dissolved constituents comprising dissolved hydrogen sulphide and a first amount of iron, the method comprising:
    contacting the feedstock in at least one stripping vessel with a stripping gas to produce a gas stream comprising at least hydrogen sulphide gas, and an intermediate feedstock, within the stripping vessel, comprising the one or more dissolved constituents and the first amount of iron,
    conveying the gas stream from the at least one stripping vessel to an oxidation reactor,
    contacting the gas stream with an oxidizing agent in the oxidation reactor to oxidize the at least hydrogen sulphide gas to produce sulphuric acid,
    conveying the produced sulphuric acid from the oxidation reactor to the at least one stripping vessel to reduce a pH value of the intermediate feedstock within the stripping vessel,
    adding a cationic coagulant comprising ferric iron to the intermediate feedstock to convert the one or more dissolved constituents to an insoluble form, and
    removing the insoluble form and the first amount of iron from a liquid fraction of the intermediate feedstock.

2. The method of claim 1 wherein a targeted pH value of the intermediate feedstock is a pH value of 4.

3. The method of claim 1 wherein the step of contacting the feedstock with a stripping gas includes increasing contact between the feedstock and the stripping gas.

4. The method of claim 3 wherein increasing contact between the feedstock and the stripping gas includes one or more selected from a group consisting of: spraying the feedstock into a headspace of the stripping vessel, bubbling the stripping gas through the feedstock and agitating the feedstock with a mechanical agitator.

5. The method of claim 1 wherein the oxidizing agent is selected from a group consisting of: oxygen, ozone, hydrogen peroxide and chlorine dioxide.

6. The method of claim 1 further comprising raising an initial temperature of the feedstock to a stripping temperature to increase a concentration of the hydrogen sulphide gas in the gas stream produced in the stripping vessel.

7. The method of claim 1 further comprising conveying a recycled stripping gas, produced in the oxidation reactor during contact between the gas stream and the oxidizing agent, to the at least one stripping vessel, and contacting the feedstock in the at least one stripping vessel with the recycled stripping gas.

8. The method of claim 1 wherein the step of removing the first amount of iron comprises oxidizing the first amount of iron to form an insoluble precipitate.

9. The method of claim 8 further comprising a step of contacting the insoluble form or the insoluble precipitate with gas bubbles to make the insoluble form or the insoluble precipitate buoyant and float over the liquid fraction.

10. The method of claim 9 wherein the gas bubbles are selected from a group consisting of: air bubbles and oxygen bubbles.

11. The method of claim 1 further comprising a step of processing the liquid fraction by passing the liquid fraction through an electrocoagulation system to remove one or more negatively charged constituents dissolved in the liquid fraction.

12. A system for removing one or more dissolved constituents at from a feedstock, the one or more dissolved constituents comprising dissolved hydrogen sulphide and a first amount of iron, the system comprising:
    at least one stripping vessel wherein the feedstock contacts a stripping gas to produce a gas stream comprising at least hydrogen sulphide gas, and an intermediate feedstock, within the stripping vessel, comprising the one or more dissolved constituents and the first amount of iron,
    a first conduit connecting the at least one stripping vessel to an oxidation reactor for conveying the gas stream comprising the hydrogen sulphide gas to the oxidation reactor, wherein the gas stream contacts an oxidizing agent to oxidize the hydrogen sulphide gas to produce sulphuric acid, and
    a second conduit connecting the oxidation reactor to the at least one stripping vessel for conveying the produced sulphuric acid from the oxidation reactor to the at least one stripping vessel to reduce a pH value of the intermediate feedstock within the stripping vessel, and
    wherein a cationic coagulant comprising ferric iron is added to the intermediate feedstock within the stripping vessel to convert the one or more dissolved constituents to an insoluble form, and wherein the insoluble form and the first amount of iron are removed from a liquid fraction of the intermediate feedstock.

13. The system of claim 12 wherein removing hydrogen sulphide gas from the gas stream in the oxidation reactor produces a recycled stripping gas, wherein the recycled stripping gas is returned to the at least one stripping vessel via the second conduit.

* * * * *